(12) United States Patent
Mauchly et al.

(10) Patent No.: US 8,390,667 B2
(45) Date of Patent: Mar. 5, 2013

(54) POP-UP PIP FOR PEOPLE NOT IN PICTURE

(75) Inventors: J. William Mauchly, Berwyn, PA (US);
Joseph T. Friel, Ardmore, PA (US);
Dihong Tian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1252 days.

(21) Appl. No.: 12/103,102

(22) Filed: Apr. 15, 2008

(65) Prior Publication Data
US 2009/0256901 A1 Oct. 15, 2009

(51) Int. Cl.
*H04N 7/14* (2006.01)
(52) U.S. Cl. ............... 348/14.07; 348/14.01; 348/14.08
(58) Field of Classification Search ............... 348/14.07, 348/14.08, E07.083; 709/204; 370/260
See application file for complete search history.

(56) References Cited

U.S. PATENT DOCUMENTS

| | | | |
|---|---|---|---|
| 2,911,462 A | 11/1959 | Brody | |
| 3,793,489 A | 2/1974 | Sank | |
| 3,909,121 A | 9/1975 | De Mesquita Cardoso | |
| D270,271 S | 8/1983 | Steele | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 5,003,532 A | 3/1991 | Ashida et al. | |
| 5,020,098 A | 5/1991 | Celli | |
| 5,033,969 A | 7/1991 | Kamimura | |
| 5,136,652 A | 8/1992 | Jibbe et al. | |
| 5,187,571 A | 2/1993 | Braun et al. | |
| 5,200,818 A | 4/1993 | Neta et al. | |
| 5,243,697 A | 9/1993 | Hoeber et al. | |
| 5,249,035 A | 9/1993 | Yamanaka | |
| 5,255,211 A | 10/1993 | Redmond | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

U.S. Appl. No. 12/781,722, filed May 17, 2010, entitled "System and Method for Providing Retracting Optics in a Video Conferencing Environment," Inventor(s): Joseph T. Friel, et al.

(Continued)

*Primary Examiner* — Andrew C Flanders
*Assistant Examiner* — Sunita Joshi
(74) *Attorney, Agent, or Firm* — Patent Capital Group

(57) ABSTRACT

A system and method for alerting participants in a videoconference that one or more participants are improperly framed by the videoconference camera is provided. An embodiment comprises a temporary self-view picture-in-picture image appearing when the number of faces detected by the videoconference camera changes. A face detection algorithm is used to determine when the number of faces being detected by the videoconference camera has changed. The self-view picture-in-picture image displays, for a duration of time, a representation of the image being captured by the videoconference camera, allowing participants who are not properly framed by the videoconference camera to adjust their position to that their faces are captured by the videoconference camera.

25 Claims, 7 Drawing Sheets

U.S. PATENT DOCUMENTS

| | | |
|---|---|---|
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,625,410 A | 4/1997 | Washino et al. |
| 5,666,153 A | 9/1997 | Copeland |
| 5,675,374 A | 10/1997 | Kohda |
| 5,689,663 A | 11/1997 | Williams |
| 5,708,787 A | 1/1998 | Nakano et al. |
| 5,713,033 A | 1/1998 | Sado |
| 5,715,377 A | 2/1998 | Fukushima et al. |
| D391,558 S | 3/1998 | Marshall et al. |
| D391,935 S | 3/1998 | Sakaguchi et al. |
| 5,729,471 A | 3/1998 | Jain et al. |
| 5,737,011 A | 4/1998 | Lukacs |
| 5,745,116 A | 4/1998 | Pisutha-Arnond |
| 5,748,121 A | 5/1998 | Romriell |
| D395,292 S | 6/1998 | Vu |
| 5,760,826 A | 6/1998 | Nayar |
| D396,455 S | 7/1998 | Bier |
| D396,456 S | 7/1998 | Bier |
| 5,790,182 A | 8/1998 | Hilaire |
| 5,796,724 A | 8/1998 | Rajamani et al. |
| D397,687 S | 9/1998 | Arora et al. |
| D398,595 S | 9/1998 | Baer et al. |
| 5,815,196 A | 9/1998 | Alshawi |
| D399,501 S | 10/1998 | Arora et al. |
| 5,818,514 A | 10/1998 | Duttweiler et al. |
| 5,821,985 A | 10/1998 | Iizawa |
| 5,825,362 A | 10/1998 | Retter |
| 5,894,321 A | 4/1999 | Downs et al. |
| D409,243 S | 5/1999 | Lonergan |
| D410,447 S | 6/1999 | Chang |
| 5,929,857 A | 7/1999 | Dinallo et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 5,996,003 A | 11/1999 | Namikata et al. |
| D419,543 S | 1/2000 | Warren et al. |
| D420,995 S | 2/2000 | Imamura et al. |
| 6,069,648 A | 5/2000 | Suso et al. |
| 6,069,658 A | 5/2000 | Watanabe |
| 6,097,390 A | 8/2000 | Marks |
| 6,101,113 A | 8/2000 | Paice |
| 6,124,896 A | 9/2000 | Kurashige |
| 6,137,485 A | 10/2000 | Kawai et al. |
| 6,148,092 A | 11/2000 | Qian |
| D435,561 S | 12/2000 | Pettigrew et al. |
| 6,167,162 A | 12/2000 | Jacquin et al. |
| 6,172,703 B1 | 1/2001 | Lee |
| 6,173,069 B1 | 1/2001 | Daly et al. |
| D438,873 S | 3/2001 | Wang et al. |
| D440,575 S | 4/2001 | Wang et al. |
| 6,211,870 B1 | 4/2001 | Foster |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,259,469 B1 | 7/2001 | Ejima et al. |
| 6,266,082 B1 | 7/2001 | Yonezawa et al. |
| 6,266,098 B1 | 7/2001 | Cove et al. |
| D446,790 S | 8/2001 | Wang et al. |
| 6,285,392 B1 | 9/2001 | Satoda et al. |
| 6,292,188 B1 | 9/2001 | Carlson et al. |
| 6,292,575 B1 | 9/2001 | Bortolussi et al. |
| D450,323 S | 11/2001 | Moore et al. |
| D453,167 S | 1/2002 | Hasegawa et al. |
| D454,574 S | 3/2002 | Wasko et al. |
| 6,356,589 B1 | 3/2002 | Gebler et al. |
| 6,380,539 B1 | 4/2002 | Edgar |
| 6,396,514 B1 | 5/2002 | Kohno |
| 6,424,377 B1 | 7/2002 | Driscoll, Jr. |
| D461,191 S | 8/2002 | Hickey et al. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| D468,322 S | 1/2003 | Walker et al. |
| 6,507,356 B1 | 1/2003 | Jackel et al. |
| D470,153 S | 2/2003 | Billmaier et al. |
| 6,515,695 B1 | 2/2003 | Sato et al. |
| D474,194 S | 5/2003 | Kates et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| D478,090 S | 8/2003 | Nguyen et al. |
| D478,912 S | 8/2003 | Johnson |
| 6,611,281 B2 * | 8/2003 | Strubbe ..................... 348/14.01 |
| D482,368 S | 11/2003 | den Toonder et al. |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| D494,186 S | 8/2004 | Johnson |
| 6,771,303 B2 | 8/2004 | Zhang et al. |
| 6,774,927 B1 | 8/2004 | Cohen et al. |
| D495,715 S | 9/2004 | Gildred |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,809,724 B1 | 10/2004 | Shiraishi et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| D506,208 S | 6/2005 | Jewitt et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,925,613 B2 | 8/2005 | Gibson |
| 6,963,653 B1 | 11/2005 | Miles |
| D512,723 S | 12/2005 | Wirz |
| 6,980,526 B2 | 12/2005 | Jang et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,028,092 B2 | 4/2006 | MeLampy et al. |
| 7,030,890 B1 | 4/2006 | Jouet et al. |
| 7,031,311 B2 | 4/2006 | MeLampy et al. |
| 7,036,092 B2 | 4/2006 | Sloo et al. |
| D521,521 S | 5/2006 | Jewitt et al. |
| 7,043,528 B2 | 5/2006 | Schmitt et al. |
| 7,046,862 B2 | 5/2006 | Ishizaka et al. |

| | | |
|---|---|---|
| D522,559 S | 6/2006 | Naito et al. |
| 7,057,636 B1 | 6/2006 | Cohen-Solal et al. |
| 7,057,662 B2 | 6/2006 | Malzbender |
| 7,058,690 B2 | 6/2006 | Maehiro |
| 7,061,896 B2 | 6/2006 | Jabbari et al. |
| D524,321 S | 7/2006 | Hally et al. |
| 7,072,504 B2 | 7/2006 | Miyano et al. |
| 7,080,157 B2 | 7/2006 | McCanne |
| 7,092,002 B2 | 8/2006 | Ferren et al. |
| 7,111,045 B2 | 9/2006 | Kato et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| D536,001 S | 1/2007 | Armstrong et al. |
| 7,158,674 B2 | 1/2007 | Suh |
| 7,161,942 B2 | 1/2007 | Chen et al. |
| 7,164,435 B2 | 1/2007 | Wang et al. |
| D536,340 S | 2/2007 | Jost et al. |
| D539,243 S | 3/2007 | Chiu et al. |
| D540,336 S | 4/2007 | Kim et al. |
| D541,773 S | 5/2007 | Chong et al. |
| D542,247 S | 5/2007 | Kinoshita et al. |
| D544,494 S | 6/2007 | Cummins |
| D545,314 S | 6/2007 | Kim |
| D547,320 S | 7/2007 | Kim et al. |
| 7,239,338 B2 | 7/2007 | Krisbergh et al. |
| 7,246,118 B2 | 7/2007 | Chastain et al. |
| D548,742 S | 8/2007 | Fletcher |
| 7,254,785 B2 | 8/2007 | Reed |
| D550,635 S | 9/2007 | DeMaio et al. |
| D551,184 S | 9/2007 | Kanou et al. |
| D551,672 S | 9/2007 | Wirz |
| 7,269,292 B2 | 9/2007 | Steinberg |
| 7,274,555 B2 | 9/2007 | Kim et al. |
| D554,664 S | 11/2007 | Van Dongen et al. |
| D555,610 S | 11/2007 | Yang et al. |
| D559,265 S | 1/2008 | Armstrong et al. |
| D560,225 S | 1/2008 | Park et al. |
| D560,681 S | 1/2008 | Fletcher et al. |
| D561,130 S | 2/2008 | Won et al. |
| 7,336,299 B2 | 2/2008 | Kostrzewski |
| D563,965 S | 3/2008 | Van Dongen et al. |
| D564,530 S | 3/2008 | Kim et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,353,462 B2 | 4/2008 | Caffarelli |
| 7,359,731 B2 | 4/2008 | Choksi |
| 7,399,095 B2 | 7/2008 | Rondinelli |
| D574,392 S | 8/2008 | Kwag et al. |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| D580,451 S | 11/2008 | Steele et al. |
| 7,471,320 B2 | 12/2008 | Malkin et al. |
| D585,453 S | 1/2009 | Chen et al. |
| 7,477,322 B2 | 1/2009 | Hsieh |
| 7,477,657 B1 | 1/2009 | Murphy et al. |
| 7,480,870 B2 | 1/2009 | Anzures et al. |
| D588,560 S | 3/2009 | Mellingen et al. |
| D589,053 S | 3/2009 | Steele et al. |
| D591,306 S | 4/2009 | Setiawan et al. |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| D595,728 S | 7/2009 | Scheibe et al. |
| D596,646 S | 7/2009 | Wani |
| 7,575,537 B2 | 8/2009 | Ellis |
| D602,033 S | 10/2009 | Vu et al. |
| D602,453 S | 10/2009 | Ding et al. |
| D602,495 S | 10/2009 | Um et al. |
| 7,610,352 B2 | 10/2009 | AlHusseini et al. |
| 7,610,599 B1 | 10/2009 | Nashida et al. |
| 7,616,226 B2 | 11/2009 | Roessler et al. |
| D608,788 S | 1/2010 | Meziere |
| 7,646,419 B2 | 1/2010 | Cernasov |
| D610,560 S | 2/2010 | Chen |
| 7,661,075 B2 | 2/2010 | Lahdesmaki |
| 7,664,750 B2 | 2/2010 | Frees et al. |
| D612,394 S | 3/2010 | La et al. |
| 7,676,763 B2 | 3/2010 | Rummel |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| D617,806 S | 6/2010 | Christie et al. |
| D619,608 S | 7/2010 | Meziere |
| D619,609 S | 7/2010 | Meziere |
| D619,610 S | 7/2010 | Meziere |
| D619,611 S | 7/2010 | Meziere |
| 7,752,568 B2 | 7/2010 | Park et al. |
| D621,410 S | 8/2010 | Verfuerth et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,861,189 B2 | 12/2010 | Watanabe et al. |
| D631,891 S | 2/2011 | Vance et al. |
| D632,698 S | 2/2011 | Judy et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| D634,726 S | 3/2011 | Harden et al. |
| D634,753 S | 3/2011 | Loretan et al. |
| D635,569 S | 4/2011 | Park |
| D635,975 S | 4/2011 | Seo et al. |
| D637,199 S | 5/2011 | Brinda |
| D638,025 S | 5/2011 | Saft et al. |
| D638,850 S | 5/2011 | Woods et al. |
| D638,853 S | 5/2011 | Brinda |
| 7,939,959 B2 | 5/2011 | Wagoner |
| D640,268 S | 6/2011 | Jones et al. |
| D642,184 S | 7/2011 | Brouwers et al. |
| 7,990,422 B2 | 8/2011 | Ahiska et al. |
| 7,996,775 B2 | 8/2011 | Cole et al. |
| 8,000,559 B2 | 8/2011 | Kwon |
| D646,690 S | 10/2011 | Thai et al. |
| D648,734 S | 11/2011 | Christie et al. |
| D649,556 S | 11/2011 | Judy et al. |
| 8,077,857 B1 | 12/2011 | Lambert |
| D652,050 S | 1/2012 | Chaudhri |
| D652,429 S | 1/2012 | Steele et al. |
| D654,926 S | 2/2012 | Lipman et al. |
| D656,513 S | 3/2012 | Thai et al. |
| 8,132,100 B2 | 3/2012 | Seo et al. |
| 8,135,068 B1 | 3/2012 | Alvarez |
| D656,948 S | 4/2012 | Knudsen et al. |
| D660,313 S | 5/2012 | Williams et al. |
| 8,179,419 B2 | 5/2012 | Girish et al. |
| 8,209,632 B2 | 6/2012 | Reid et al. |
| 8,219,920 B2 | 7/2012 | Langoulant et al. |
| D664,985 S | 8/2012 | Tanghe et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |

| | | | | | |
|---|---|---|---|---|---|
| 2002/0149672 A1 | 10/2002 | Clapp et al. | 2007/0070177 A1 | 3/2007 | Christensen |
| 2002/0163538 A1 | 11/2002 | Shteyn | 2007/0074123 A1 | 3/2007 | Omura et al. |
| 2002/0186528 A1 | 12/2002 | Huang | 2007/0080845 A1 | 4/2007 | Amand |
| 2003/0017872 A1 | 1/2003 | Oishi et al. | 2007/0112966 A1 | 5/2007 | Eftis et al. |
| 2003/0048218 A1 | 3/2003 | Milnes et al. | 2007/0120971 A1 | 5/2007 | Kennedy |
| 2003/0072460 A1 | 4/2003 | Gonopolskiy et al. | 2007/0121353 A1 | 5/2007 | Zhang et al. |
| 2003/0149724 A1 | 8/2003 | Chang | 2007/0140337 A1 | 6/2007 | Lim et al. |
| 2003/0160861 A1 | 8/2003 | Barlow et al. | 2007/0153712 A1 | 7/2007 | Fry et al. |
| 2003/0179285 A1 | 9/2003 | Naito | 2007/0157119 A1 | 7/2007 | Bishop |
| 2003/0185303 A1 | 10/2003 | Hall | 2007/0159523 A1 | 7/2007 | Hillis et al. |
| 2003/0197687 A1 | 10/2003 | Shetter | 2007/0162866 A1 | 7/2007 | Matthews et al. |
| 2004/0003411 A1 | 1/2004 | Nakai et al. | 2007/0183661 A1 | 8/2007 | El-Maleh et al. |
| 2004/0032906 A1 | 2/2004 | Lillig | 2007/0188597 A1 | 8/2007 | Kenoyer et al. |
| 2004/0038169 A1 | 2/2004 | Mandelkern et al. | 2007/0192381 A1 | 8/2007 | Padmanabhan |
| 2004/0039778 A1 | 2/2004 | Read et al. | 2007/0206091 A1 | 9/2007 | Dunn et al. |
| 2004/0061787 A1 | 4/2004 | Liu et al. | 2007/0206556 A1 | 9/2007 | Yegani et al. |
| 2004/0091232 A1 | 5/2004 | Appling, III | 2007/0217406 A1 | 9/2007 | Riedel et al. |
| 2004/0118984 A1 | 6/2004 | Kim et al. | 2007/0217500 A1 | 9/2007 | Gao et al. |
| 2004/0119814 A1 | 6/2004 | Clisham et al. | 2007/0229250 A1 | 10/2007 | Recker et al. |
| 2004/0164858 A1 | 8/2004 | Lin | 2007/0240073 A1 | 10/2007 | McCarthy et al. |
| 2004/0165060 A1 | 8/2004 | McNelley et al. | 2007/0247470 A1 | 10/2007 | Dhuey et al. |
| 2004/0178955 A1 | 9/2004 | Menache et al. | 2007/0250567 A1 | 10/2007 | Graham et al. |
| 2004/0189463 A1 | 9/2004 | Wathen | 2007/0250620 A1 | 10/2007 | Shah et al. |
| 2004/0189676 A1 | 9/2004 | Dischert | 2007/0263079 A1 | 11/2007 | Graham et al. |
| 2004/0196250 A1 | 10/2004 | Mehrotra et al. | 2007/0279483 A1 | 12/2007 | Beers et al. |
| 2004/0207718 A1 | 10/2004 | Boyden et al. | 2007/0279484 A1 | 12/2007 | Derocher et al. |
| 2004/0218755 A1 | 11/2004 | Marton et al. | 2008/0046840 A1 | 2/2008 | Melton et al. |
| 2004/0221243 A1 | 11/2004 | Twerdahl et al. | 2008/0077390 A1 | 3/2008 | Nagao |
| 2004/0246962 A1 | 12/2004 | Kopeikin et al. | 2008/0077883 A1 | 3/2008 | Kim et al. |
| 2004/0254982 A1 | 12/2004 | Hoffman et al. | 2008/0084429 A1 | 4/2008 | Wissinger |
| 2004/0260796 A1 | 12/2004 | Sundqvist et al. | 2008/0119211 A1 | 5/2008 | Paas et al. |
| 2005/0007954 A1 | 1/2005 | Sreemanthula et al. | 2008/0134098 A1 | 6/2008 | Hoglund et al. |
| 2005/0022130 A1 | 1/2005 | Fabritius | 2008/0136896 A1 | 6/2008 | Graham et al. |
| 2005/0024484 A1 | 2/2005 | Leonard | 2008/0148187 A1 | 6/2008 | Miyata et al. |
| 2005/0034084 A1 | 2/2005 | Ohtsuki et al. | 2008/0151038 A1 | 6/2008 | Khouri et al. |
| 2005/0039142 A1 | 2/2005 | Jalon et al. | 2008/0167078 A1 | 7/2008 | Elbye |
| 2005/0050246 A1 | 3/2005 | Lakkakorpi et al. | 2008/0208444 A1 | 8/2008 | Ruckart |
| 2005/0081160 A1 | 4/2005 | Wee et al. | 2008/0212677 A1 | 9/2008 | Chen et al. |
| 2005/0099492 A1 | 5/2005 | Orr | 2008/0215974 A1 | 9/2008 | Harrison et al. |
| 2005/0110867 A1 | 5/2005 | Schulz | 2008/0215993 A1 | 9/2008 | Rossman |
| 2005/0117022 A1 | 6/2005 | Marchant | 2008/0218582 A1 | 9/2008 | Buckler |
| 2005/0129325 A1 | 6/2005 | Wu | 2008/0232692 A1 | 9/2008 | Kaku |
| 2005/0147257 A1 | 7/2005 | Melchior et al. | 2008/0240237 A1 | 10/2008 | Tian et al. |
| 2005/0149872 A1 | 7/2005 | Fong et al. | 2008/0240571 A1 | 10/2008 | Tian et al. |
| 2005/0154988 A1 | 7/2005 | Proehl et al. | 2008/0246833 A1 | 10/2008 | Yasui et al. |
| 2005/0223069 A1 | 10/2005 | Cooperman et al. | 2008/0256474 A1 | 10/2008 | Chakra et al. |
| 2005/0248652 A1 | 11/2005 | Firestone et al. | 2008/0261569 A1 | 10/2008 | Britt et al. |
| 2005/0251760 A1 | 11/2005 | Sato et al. | 2008/0266380 A1 | 10/2008 | Gorzynski et al. |
| 2005/0268823 A1 | 12/2005 | Bakker et al. | 2008/0267282 A1 | 10/2008 | Kalipatnapu et al. |
| 2006/0013495 A1 | 1/2006 | Duan et al. | 2008/0276184 A1 | 11/2008 | Buffet et al. |
| 2006/0017807 A1 | 1/2006 | Lee et al. | 2008/0297586 A1* | 12/2008 | Kurtz et al. ................. 348/14.08 |
| 2006/0028983 A1 | 2/2006 | Wright | 2008/0298571 A1 | 12/2008 | Kurtz et al. |
| 2006/0038878 A1 | 2/2006 | Takashima et al. | 2008/0303901 A1 | 12/2008 | Variyath et al. |
| 2006/0048070 A1 | 3/2006 | Taylor et al. | 2009/0009593 A1 | 1/2009 | Cameron et al. |
| 2006/0056056 A1 | 3/2006 | Ahiska et al. | 2009/0012633 A1 | 1/2009 | Liu et al. |
| 2006/0066717 A1 | 3/2006 | Miceli | 2009/0037827 A1 | 2/2009 | Bennetts |
| 2006/0072813 A1 | 4/2006 | Matsumoto et al. | 2009/0051756 A1 | 2/2009 | Trachtenberg |
| 2006/0082643 A1 | 4/2006 | Richards | 2009/0115723 A1 | 5/2009 | Henty |
| 2006/0093128 A1 | 5/2006 | Oxford | 2009/0119603 A1 | 5/2009 | Stackpole |
| 2006/0100004 A1 | 5/2006 | Kim et al. | 2009/0122867 A1 | 5/2009 | Mauchly et al. |
| 2006/0104470 A1 | 5/2006 | Akino | 2009/0172596 A1 | 7/2009 | Yamashita |
| 2006/0120307 A1 | 6/2006 | Sahashi | 2009/0174764 A1 | 7/2009 | Chadha et al. |
| 2006/0120568 A1 | 6/2006 | McConville et al. | 2009/0183122 A1 | 7/2009 | Webb et al. |
| 2006/0125691 A1 | 6/2006 | Menache et al. | 2009/0193345 A1 | 7/2009 | Wensley et al. |
| 2006/0126878 A1 | 6/2006 | Takumai et al. | 2009/0204538 A1 | 8/2009 | Ley et al. |
| 2006/0152489 A1 | 7/2006 | Sweetser et al. | 2009/0207233 A1 | 8/2009 | Mauchly et al. |
| 2006/0152575 A1 | 7/2006 | Amiel et al. | 2009/0207234 A1 | 8/2009 | Chen et al. |
| 2006/0158509 A1 | 7/2006 | Kenoyer et al. | 2009/0217199 A1 | 8/2009 | Hara et al. |
| 2006/0168302 A1 | 7/2006 | Boskovic et al. | 2009/0228807 A1 | 9/2009 | Lemay |
| 2006/0170769 A1 | 8/2006 | Zhou | 2009/0244257 A1 | 10/2009 | MacDonald et al. |
| 2006/0181607 A1 | 8/2006 | McNelley et al. | 2009/0260060 A1 | 10/2009 | Smith et al. |
| 2006/0200518 A1 | 9/2006 | Sinclair et al. | 2009/0265628 A1 | 10/2009 | Bamford et al. |
| 2006/0233120 A1 | 10/2006 | Eshel et al. | 2009/0279476 A1 | 11/2009 | Li et al. |
| 2006/0256187 A1 | 11/2006 | Sheldon et al. | 2009/0322082 A1 | 12/2009 | Wagoner |
| 2006/0284786 A1 | 12/2006 | Takano et al. | 2009/0324023 A1 | 12/2009 | Tian et al. |
| 2006/0289772 A1 | 12/2006 | Johnson et al. | 2010/0005419 A1 | 1/2010 | Miichi et al. |
| 2007/0022388 A1 | 1/2007 | Jennings | 2010/0027907 A1 | 2/2010 | Cherna et al. |
| 2007/0039030 A1 | 2/2007 | Romanowich et al. | 2010/0030389 A1 | 2/2010 | Palmer et al. |
| 2007/0040903 A1 | 2/2007 | Kawaguchi | 2010/0049542 A1 | 2/2010 | Benjamin et al. |

| | | | |
|---|---|---|---|
| 2010/0118112 | A1 | 5/2010 | Nimri et al. |
| 2010/0123770 | A1 | 5/2010 | Friel et al. |
| 2010/0171807 | A1 | 7/2010 | Tysso |
| 2010/0171808 | A1 | 7/2010 | Harrell et al. |
| 2010/0183199 | A1 | 7/2010 | Smith et al. |
| 2010/0199228 | A1 | 8/2010 | Latta et al. |
| 2010/0201823 | A1 | 8/2010 | Zhang et al. |
| 2010/0205281 | A1 | 8/2010 | Porter et al. |
| 2010/0205543 | A1 | 8/2010 | Von Werther et al. |
| 2010/0208078 | A1 | 8/2010 | Tian et al. |
| 2010/0225732 | A1 | 9/2010 | De Beer et al. |
| 2010/0259619 | A1 | 10/2010 | Nicholson |
| 2010/0262367 | A1 | 10/2010 | Riggins et al. |
| 2010/0277563 | A1 | 11/2010 | Gupta et al. |
| 2010/0306703 | A1 | 12/2010 | Bourganel et al. |
| 2010/0313148 | A1 | 12/2010 | Hochendoner et al. |
| 2010/0316232 | A1 | 12/2010 | Acero et al. |
| 2010/0325547 | A1 | 12/2010 | Keng et al. |
| 2011/0008017 | A1 | 1/2011 | Gausereide |
| 2011/0029868 | A1 | 2/2011 | Moran et al. |
| 2011/0063467 | A1 | 3/2011 | Tanaka |
| 2011/0082808 | A1 | 4/2011 | Beykpour et al. |
| 2011/0085016 | A1 | 4/2011 | Kristiansen et al. |
| 2011/0113348 | A1 | 5/2011 | Twiss et al. |
| 2011/0202878 | A1 | 8/2011 | Park et al. |
| 2011/0225534 | A1 | 9/2011 | Wala |
| 2011/0242266 | A1 | 10/2011 | Blackburn et al. |
| 2011/0249081 | A1 | 10/2011 | Kay et al. |
| 2011/0249086 | A1 | 10/2011 | Guo et al. |
| 2011/0276901 | A1 | 11/2011 | Zambetti et al. |
| 2011/0279627 | A1 | 11/2011 | Shyu |
| 2011/0319885 | A1 | 12/2011 | Skwarek et al. |
| 2012/0026278 | A1 | 2/2012 | Goodman et al. |
| 2012/0038742 | A1 | 2/2012 | Robinson et al. |
| 2012/0226997 | A1 | 9/2012 | Pang |

FOREIGN PATENT DOCUMENTS

| | | | |
|---|---|---|---|
| EP | 502600 | A2 | 9/1992 |
| EP | 0 650 299 | | 10/1994 |
| EP | 0 714 081 | | 11/1995 |
| EP | 0 740 177 | | 4/1996 |
| EP | 1143745 | A2 | 10/2001 |
| EP | 1 178 352 | A1 | 6/2002 |
| EP | 1 589 758 | A1 | 10/2005 |
| EP | 1701308 | A2 | 9/2006 |
| EP | 1768058 | A2 | 3/2007 |
| EP | 2073543 | A1 | 6/2009 |
| EP | 2255531 | | 12/2010 |
| EP | 2277308 | | 1/2011 |
| GB | 2 294 605 | A | 5/1996 |
| GB | 2336266 | | 10/1999 |
| GB | 2355876 | A | 5/2001 |
| WO | WO 94/016517 | | 7/1994 |
| WO | WO 96/21321 | | 7/1996 |
| WO | WO 97/08896 | | 3/1997 |
| WO | WO 98/47291 | | 10/1998 |
| WO | WO 99/59026 | | 11/1999 |
| WO | WO 01/33840 | | 5/2001 |
| WO | WO 2005/013001 | A2 | 2/2005 |
| WO | WO 2005/031001 | A3 | 2/2005 |
| WO | WO 2006/072755 | | 7/2006 |
| WO | WO2007/106157 | | 9/2007 |
| WO | WO2007/123946 | | 11/2007 |
| WO | WO 2007/123960 | A2 | 11/2007 |
| WO | WO 2007/123960 | A3 | 11/2007 |
| WO | WO2008/039371 | | 4/2008 |
| WO | WO 2008/040258 | | 4/2008 |
| WO | WO 2008/101117 | A1 | 8/2008 |
| WO | WO 2008/118887 | A2 | 10/2008 |
| WO | WO 2008/118887 | A3 | 10/2008 |
| WO | WO 2009/102503 | A2 | 8/2009 |
| WO | WO 2009/102503 | A3 | 8/2009 |
| WO | WO 2009/120814 | A2 | 10/2009 |
| WO | WO 2009/120814 | A3 | 10/2009 |
| WO | WO 2010/059481 | | 5/2010 |
| WO | WO2010/096342 | | 8/2010 |
| WO | WO 2010/104765 | | 9/2010 |
| WO | WO 2010/132271 | | 11/2010 |
| WO | WO2012/033716 | | 3/2012 |

OTHER PUBLICATIONS

U.S. Appl. No. 12/877,833, filed Sep. 8, 2010, entitled "System and Method for Skip Coding During Video Conferencing in a Network Environment," Inventor[s]: Dihong Tian, et al.

U.S. Appl. No. 12/870,687, filed Aug. 27, 2010, entitled "System and Method for Producing a Performance Via Video Conferencing in a Network Environment," inventor(s): Michael A. Arnao et al.

U.S. Appl. No. 12/912,556, filed Oct. 26 2010, entitled "System and Method for Provisioning Flows in a Mobile Network Environment," inventors: Baiaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/873,100, filed Aug. 31, 2010, entitled "System and Method for Providing Depth Adaptive Video Conferencing" inventor(s): J. William Mauchly et al.

U.S. Appl. No. 12/946,679, filed Nov. 15, 2010, entitled "System and Method for Providing Camera Functions in a Video Environment," Inventors: Peter A.J. Forrnell, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors: David J. Mackie et al.

U.S. Appl. No. 12/950,786, filed Nov. 19, 2010, entitled "System and Method for Providing Enhanced Video Processing in a Network Environment," Inventor[s]: David J. Mackie.

U.S. Appl. No. 12/907,919, filed Oct. 19, 2010, entitled "System and method for providing connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture interface Control," Inventors: Shuan K. Kirby, et al.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for Managing Flows in a Mobile Network Environment," Inventors: Balaji Venkat Venkataswami et al.

U.S. Appl. No. 12/946,709, filed Nov. 15, 2010, entitled "System and Method for Providing Enhanced Graphics in a Video Environment," Inventors: John M. Kanalakis, Jr., et al.

U.S. Appl. No. 29/375,624, filed Sep. 24, 2010, entitled "Mounted Video Unit," Inventor(s): Ashok T. Desai et al.

U.S. Appl. No. 29/375,627, filed Sep. 24, 2010, entitled "Mounted Video Unit," Inventor(s): Ashok T. Desai et al.

U.S. Appl. No. 29/369,951, filed Sep. 15, 2010, entitled "Video Unit With Integrated Features," Inventor(s): Kyle A. Buzzard et al.

U.S. Appl. No. 29/375,458, filed Sep. 22, 2010, entitled "Video Unit with Integrated Features," Inventor(s): Kyle A. Buzzard et al.

U.S. Appl. No. 29/375,619, filed Sep. 24, 2010, entitled "Free-Standing Video Unit," Inventor(s): Ashok T. Desai et al.

U.S. Appl. No. 29/381,245, filed Dec. 16, 2010, entitled "Interface Element," Inventor(s): John M. Kanalakis, Jr., et al.

U.S. Appl. No. 29/381,250, filed Dec. 16, 2010, entitled "Interface Element," Inventor(s): John M. Kanalakis, Jr., et al.

U.S. Appl. No. 29/381,254, filed Dec. 16, 2010, entitled "Interface Element," Inventor(s); John M. Kanalakis, Jr., et al.

U.S. Appl. No. 29/381,256, filed Dec. 16, 2010, entitled "Interface Element," Inventor(s): John M. Kanalakis, Jr., et al.

U.S. Appl. No. 29/381,259, filed Dec. 16, 2010, entitled "Interface Element," Inventor(s): John M. Kanalakis, Jr., et al.

U.S. Appl. No. 29/381,260, filed Dec. 16, 2010, entitled "Interface Element," Inventor(s): John M. Kanalakis, Jr. et al.

U.S. Appl. No. 29/381,262, filed Dec. 16, 2010, entitled "Interface Element," Inventor(s): John M. Kanalakis, Jr., et al.

U.S. Appl. No. 29/381,264, filed Dec. 16, 2010, entitled "Interface Element," Inventor(s): John M. Kanalakis, Jr., et al.

3G, "World's First 3G Video Conference Service with New TV Commercial," Apr. 28, 2005, 4 pages; http://www.3g.co.uk/PR/April2005/1383.htm.

"Andersson, L., et al., ""LDP Specification," Network Working Group, RFC 3036, Jan. 2001, 133 pages; http://tools.ietf.org/html/rfc3036.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.

Chen, Qing et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwjSMwjpGp-3goVzSWad6CO-Jzw.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

Digital Video Enterprises, "DVE Eye Contact Silhouette," 1 page, ® DVE 2008; http://www.dvetelepresence.com/products/eyeContactSilhouette.asp.

Gluckman, Joshua, et al., "Rectified Catadioptric Stereo Sensors," 8 pages, retrieved and printed on May 17, 2010; http://cis.poly.edu/~gluckman/papers/cvpr00.pdf.

Gundavelli, S., et al., "Proxy Mobile IPv6," Network Working Group, RFC 5213, Aug. 2008, 93 pages; http://tools.ietf.org/pdf/rfc5213.pdf.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Jamoussi, Bamil, "Constraint-Based LSP Setup Using LDP," MPLS Working Group, Sep. 1999, 34 pages; http://tools.ietf.org/html/draft-ietf-mpls-cr-idp-03.

Jeyatharan, M., et al.,"3GPP TFT Reference for Flow Binding," MEXT Working Group, Mar. 2, 2010, 11 pages; http:/www.ietf.org/id/draft-jeyatharan-mext-flow-tftemp-reference-00.txt.

Kollarits, R.V., et al., "34.3: An Eye Contact Camera/Display System for Videophone Applications Using a Conventional Direct-View LCD," © 1995 SID, ISSN0097-0966X/95/2601, pp. 765-68; http://citeseerx.ist.psu.edu/viewdoc/download;jsessionid=47A1E7E028C26503975E633895D114EC?doi=10.1.1.42.1772&rep=rep1&type=pdf.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

PCT "Notification of Transmittal of the international Search Report and the Written Opinion of the International Searching Authority, or the Declaration," PCT/US2009/001070, dated Apr. 4, 2009, 17 pages.

PCT International Preliminary Report of Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

"Real-time Hand Motion/Gesture Detection for HCI-Demo 2," video clip, YouTube, posted Dec. 17, 2008 by smmy0705, 1 pages; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v.F8GVeV0dYLM&feature=related.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flox-binding-04.

Sudan, Ranjeet, "Signaling in MPLS Networks with RSVP-TE-Technology Information," Telecommunications, Nov. 2000, 3 pages; http://findarticies.com/p/articies/mi_mOTLC/is_11_34/ai_67447072/.

Trevor Darrell, "A Real-Time Virtual Mirror Display," 1 page, Sep. 9, 1998; http://people.csail.mit.edu/trevor/papers/1998-021/node6.html.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgG002uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Tranaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffier, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.
Video on Ted.com, Pranav Mistry: the interactive Potential of SixthSense Technology (5 pages), and interactive Transcript (5 pages), retrieved and printed on Nov. 30, 2010; http://www.ted.com/talks/pranav_mistry_the_thrilling_potential_of_sixthsense_technology.html.
"John Underkoffler points to the future of UI," video clip and interactive transcript, Video on TED.com, Jun. 2010, 6 pages; http://www.ted.com/talks/john_underkoffler_drive_data_with_a_gesture.html.
Kramer, Kwindla, "Oblong on Bloomberg TV," Oblong Industries, Inc. Web Log, Jan. 28, 2010, 1 page; http://oblong.com/article/0AN_1KD9q990PEnw.html.
Kramer, Kwindla, "g-speak at RISD, Fall 2009," Oblong industries, Inc. Web Log, Oct. 29, 2009, 1 page; http://oblong.com/article/09uW060q6xRIZYvm.html.
Kramer, Kwindla, "g-speak + TMG," Oblong Industries, Inc. Web Log, Mar. 24, 2009, 1 page; http://oblong.com/article/08mM77zpYMm7kFtv.html.
"g-stalt version 1," video clip, YouTube.com, posted by ziggles on Mar. 15, 2009, 1 page; http://youtube.com/watch?v=k8ZAql4mdvk.
Underkoffler, John, "Carlton Sparrell speaks at MIT," Oblong Industries, Inc. Web Log, Oct. 30, 2009, 1 page; http://oblong.com/article/09usAB4l1Ukb6CPw.html.
Underkoffler, John, "Carlton Sparrell at MIT Media Lab," video clip, Vimeo.com, 1 page, [Retrieved and printed Dec. 1, 2010] http://vimeo.com/7355992.
Underkoffler, John, "Oblong at Altitude: Sundance 2009," Oblong Industries, Inc. Web Log, Jan. 20, 2009, 1 page; http://oblong.com/articie/08Sr62ron_2akg0D.html.
Underkoffler, John, "Oblong's tamper system 1801011309," video clip, Vimeo,com, 1 page, [Retrieved and printed Dec. 1, 2010] http://vimeo.com/2821182.
Feld, Brad, "Science Fact," Oblong Industries, Inc. Web Log, Nov. 13, 2008, 2 pages,http://oblong.com/article/084H-PKI5Tb9I4Ti.html.
Kwindla Kramer, "g-speak in slices," Oblong Industries, Inc. Web Log, Nov. 13, 2008, 6 pages; http://oblong.com/article/0866jqfNrFg1Neuk.html.
Underkoffler, John, "Origins: arriving here," Oblong Industries, Inc. Web Log, Nov. 13, 2008, 5 pages; http://oblong.com/article/085zBpRSY9JeLv2z.html.
Rishel, Christian, "Commercial overview: Platform and Products," Nov. 13, 2008, 3 pages; http://oblong.com/article/086E19gPvDcktAf9.html.
U.S. Appl. No. 12/234,291, filed Sep. 19, 2008, entitled "System and Method for Enabling Communication Sessions in a Network Environment," Inventor(s): Yifan Gao et al.
U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,540, filed Mar. 9, 2009, entitled "System and Method for Providing Three Dimensional Video Conferencing in a Network Environment," Inventor(s): Karthik Dakshinamoorthy et al.
U.S. Appl. No. 12/400,582, filed Mar. 9, 2009, entitled "System and Methods for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/784,257, filed May 20, 2010, entitled "Implementing Selective Image Enhancement," Inventors: Dihong Tian et al.

"3D Particles Experiments in AS3 and Flash CS3," printed Mar. 18, 2010, 2 pages: http://www.flashandmath.com/advanced/fourparticles/notes.html.
Active8-3D—Holographic Projection—3D Hologram Retail Display & Video Project, [retrieved Feb. 24, 2009], http://www.activ8-3d.co.uk/3d_holocubes, 1 page.
Avrithis, Y., et al., "Color-Based Retrieval of Facial Images," European Signal Processing Conference (EUSIPCO '00), Tampere, Finland; Sep. 2000; 18 pages.
Boccaccio, Jeff; CEPro, "Inside HDMI CEC: The Little-Known Control Feature," http://www.cepro.com/articie/print/inside_hdmi_cec_the_little_known_control_feature; Dec. 28, 2007, 2 pages.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24; 3pgs.
Chen, Jason, "iBluetooth Lets iPhone Users Send and Received Files Over Bluetooth," Mar. 13, 2009; 1 page; http://i.gizmodo.com/5169545/ibluetooth-lets-iphone-users-send-and-receive-files-over-bluetooth.
Costa, Cristina, et al., "Quality Evaluation and Nonuniform Compression of Geometrically Distorted Image Using the Quadtree Distorion Map," Eurasip Journal on Applied Signal Processing, vol. 2004, No. 12; pp. 1899-1911; ©2004 Hindawi Publishing Corp.; XP002536356; ISSN: 1110-8657; 16 pages.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2003-59.pdf, 41 pages.
Daly, S., et al., "Face-based visually-optimized image Sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.
Diaz, Jesus, iPhone Bluetooth File Transfer Coming Soon (YES!); Jan. 25, 2009: 1 page; http://i.gizmodo.com/5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/Zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.
"Dynamic Displays," Copyright 2005-2008 [retrieved Feb. 24, 2009], http://www.zebraimaging.com/html/lighting_display.html, 2 pages.
ECmag.com, "IBS Products," Published Apr. 2009, 2 pages; http://www.ecmag.com/index.cfm?fa=article&articleID=10065.
Electrophysics Glossary, "Infrared Cameras, Thermal Imaging, Night Vision, Roof Moisture Detection," printed Mar. 18, 2010, 11 pages; http://www.electrophysics.com/Browse/Brw_Glossary.asp.
Farrukh, A., et al., Automated Segmentation of Skin-Tone Regions in Video Sequences, Proceedings IEEE Students Conference, ISCON_apos_02; Aug. 16-17, 2002; pp. 122-128; 7pgs.
Fiala, Mark, "Automatic Projector Calibration Using Self-Identifying Pattern," National Research Council of Canada, 2005;http://www.procams,org/procams2005/papers/procams05-36.pdf; 6 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; 10 pages.
Gotchev, Atanas, "Computer Technologies for 3D Video Delivery for Home Entertainment," International Conference on Computer Systems and Technologies; CompSysTech '08; 6 pgs; http://ecet.ecs.ru.acad.bg/cst08/docs/cp/Plenary/P.1.pdf.

Gries, Dan, "3D Particles Experiments in AS3 and Flash CS3, Dan's Comments," printed May 24, 2010 http://www.flashandmath.com/advanced/fourparticles/notes.html; 3pgs.

Guernsey, Lisa, "Toward Better Communication Across the Language Barrier," Jul. 29, 1999, http://www.nytimes.com/1999/07/29/technology/toward-better-communication-across-the-language-barrier.html; 2 pages.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-97; XP011115755; 13 pages.

Holographic imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.

Hornbeck, Larry J., "Digital Light Processing™: A New MEMS-Based Display Technology," [retrieved Feb. 26, 2009]; http://focus.ti.com/pdfs/dlpdmd/17_Digital_Light_Processing_MEMS_display_technology.pdf, 22 pages.

"Infrared Cameras TVS-200-EX," printed May 24, 2010; 3 pgs.; http://www.electrophysics.com/Browse/Brw_ProductLineCategary.asp?CategoryID=184&Area=IS.

IR Distribution Category @ Envious Technology, "IR Distribution Category," 2 pages http://www.envioustechnology.com.au/products/product-list.php?CID=305, printed on Apr. 22, 2009.

IR Trans—Products and Orders—Ethernet Devices, 2 pages http://www.irtrans.de/en/shop/lan.php, printed on Apr. 22, 2009.

Isgro, Francesco et al., "Three-Dimensional Image Processing in the Future of Immersive Media," IEEE Transactions on Circuits and Systems for Video Technology, vol. 14, No. 3: XP011108796; ISSN: 1051-8215; Mar. 1, 2004; pp. 288-303; 16 pages.

Itoh, Hiroyasu, et al., "Use of a gain modulating framing camera for time-resolved imaging of cellular phenomena," SPIE vol. 2979, 1997, pp. 733-740; 8 pages.

Kauff, Peter, et al., "An immersive 3D Video-Conferencing System Using Shared Virtual Team User Environments," Proceedings of the 4th International Conference on Collaborative Virtual Environments, XP040139458; Sep. 30, 2002; 8 pages.

Kazutake, Uehira, "Simulation of 3D image depth perception in a 3D display using two stereoscopic displays at different depths," http://adsabs.harvard.edu/abs/2006SPIE.6055.408U; 2006, 2 pgs.

Keijser, Jeroen, et al., "Exploring 3D Interaction in Alternate Control-Display Space Mappings," IEEE Symposium on 3D User interfaces, Mar. 10-11, 2007, pp. 17-24; 8 pages.

Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp/stamp.jsp?tp=&arnumber=4455782&isnumber=4455723.

Lawson, S., "Cisco Plans TelePresence Translation New Year," Dec. 9, 2008; http://www.pcworld.com/_article/155237/.html?tk=rss_news; 2 pages.

Miller, Gregor, et al., "Interactive Free-Viewpoint Video," Centre for Vision, Speech and Signal Processing, [retrieved Feb. 26, 2009], http://www.ee.surrey.ac.uk/CVSSP/VMRG/ Publications/miller05cvmp.pdf, 10 pages.

"Minoru from Novo is the worlds first consumer 3D Webcam," Dec. 11, 2008 [retrieved Feb. 24, 2009], http://www.minoru3d.com, 4 pages.

Mitsubishi Electric Research Laboratories, copyright 2009 [Retrieved Feb. 26, 2009], http://www.merl.com/projects/3dtv, 2 pages.

National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.

OptoIQ, "Anti-Speckle Techniques Uses Dynamic Optics," Jun. 1, 2009, 2 pages: http://www.optoiq.com/index/photonics-technologies-applications/ifw-display/ifw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html.

OptoIQ, "Smart Camera Supports Multiple Interfaces," Jan. 22, 2009, 2 pages. http://www.optoiq.com/index/machine-vision-imaging-processina/display/vsd-articie-display/350639/article/vision-systems-design/daily-product-2/2009/01/smart-camera-supports-multiple-interfaces.html.

OptoIQ, "Vision Systems Design—Machine Vision and Image Processing Technology," printed Mar. 18, 2010, 2 pages; http://www.optoiq.com/index/machine-vision-imaging-processing.html.

PCT "Notification of Transmittal of the International Search Report and the Written Opinion of the International Searching Authority, or the Declaration," PCT/US2009/001070, dated Apr. 8, 2009, 17 pages.

PCT Notification of Transmittal of the International Search Report and the Written Opinion of the International Searching Authority, or the Declaration; PCT/US2009/038310; dated Oct. 10, 2009; 19 pages.

Radhika, N., et al., "Mobile Dynamic reconfigurable Context aware middleware for Adhoc smart spaces," vol. 22, 2008, 3 pages http://www.acadjournal.com/2008/V22/part6/p7.

"Rayvel Business-to-Business Products," copyright 2004 [retrieved Feb. 24, 2009], http://www.rayvel.com/b2b.html, 2 pages.

"Robust Face Localisation Using Motion, Colour & Fusion" Dec. 10, 2003; Proc. VIIth Digital Image Computing: Techniques and Applications, Sun C. et al (Eds.), Sydney; 10 pgs.; Retrieved from the Internet: http://www.cmis.csiro.au/Hugues.Talbot/dicta2003/cdrom/pdf/0899.pdf; pp. 899-908, XP007905630.

School of Computing, "Bluetooth over IP for Mobile Phones," 1 page http://www.computing.dcu.ie/wwwadmin/fyp-abstract/list/fyp_details05.jsp?year=2005&number=51470574.

Sena, "Industrial Bluetooth," 1 page http://www.sena.com/products/industrial_bluetooth, printed on Apr. 22, 2009.

Shaffer, Shmuel, "Translation—State of the Art" presentation; Jan. 15, 2009; 22 pages.

Shi, C. et al., "Automatic Image Quality improvement for Videoconferencing," IEEE ICASSP © 2004, 4 pgs.

Smarthome, "IR Extender Expands Your IR Capabilities," 3 pages http://www.smarthome.com/8121.html, printed Apr. 22, 2009.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; pp. 78-88; XP007905596; 11pgs.

"Super Home Inspectors or Super Inspectors," printed Mar. 18, 2010, 3 pages; http://www.umrt.com/PageManager/Default.aspx/PageID=2120325.

Total immersion, Video Gallery, copyright 2008-2009 [retrieved Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/popers/VidReg-final.pdf.

Tsapatsoulis, N., et al., "Face Detection for Multimedia Applications," Proceedings of the ICIP '00; Vancouver, BC, Canada; Sep. 2000; 4pages.

Tsapatsoulis, N., et al., "Face Detection in Color Images and Video Sequences," 10th Mediterranean Electrotechnical Conference (MELECON), 2000; vol. 2; pp. 498-502; 21 pgs.

Wang, Hualu, et al., "A Highly Efficient System for Automatic Face Region Detection InMPEG Video," IEEE Transactions on Circuits and Systems for Video Technology; vol. 7, Issue 4; 1977 pp. 615-628; 26 pgs.

Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.

WirelessDevNet, Melody Launches Bluetooth Over IP, http://www.wirelessdevnet.com/news/2001/155/news5.html; 2 pages, printed on Jun. 5, 2001.

WO 2008/118887 A3 Publication with PCT International Search Report (4 pages), Internattonal Preliminary Report on Patentability (1 page), and Written Opinion of the ISA (7 pages); PCT/US2008/058079; dated Sep. 18, 2008.

Yang, Jie, et al., "A Real-Time Face Tracker," Proceedings 3$^{rd}$ IEEE Workshop on Applications of Computer Vision; 1996; Dec. 2-4, 1996; pp. 142-147; 6 pgs.

Yang, Ming-Hsuan, et al., "Detecting Faces in Images: A Survey," vol. 24; No. 1; Jan. 2002; pp. 34-58; 25 pgs.

Yoo, Byounghun, et al., "Image-Based Modeling of Urban Buildings Using Aerial Photographs and Digital Maps," Transactions in GIS, vol. 10 No. 3. p. 377-394, 2006; 18 pages [retreived May 17, 2010], http://icad,kaist.ac.kr/publication/paper_data/image_based.pdf.

U.S. Appl. No. 13/036,925, filed Feb. 28, 2011 ,entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Environment," Inventors: Charles C. Byers.

U.S. Appl. No. 29/389,651, filed Apr. 14, 2011, entitled "Video Unit With Integrated Features," Inventor(s): Kyle A. Buzzard et al.

U.S. Appl. No. 29/389,654, filed Apr. 14, 2011, entitled "Video Unit With Integrated Features," Inventor(s): Kyle A. Buzzard et al.

Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.

EPO Aug. 15, 2011 Response to EPO Communication mailed Feb. 25, 2011 from European Patent Application No. 09725288.6; 15 pages.

EPO Communication dated Feb. 25, 2011 for EP09725288.6 (published as EP22777308); 4 pages.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Hammadi, Nai Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-206; XP010927285 [Abstract Only].

PCT Sep. 25, 2007 Notification of Transmittal of the International Search Report from PCT/US06/45895.

PCT Sep. 2, 2008 International Preliminary Report on Patentability (1 page) and the Written Opinion of the ISA (4 pages) from PCT/US2006/045895.

PCT Sep. 11, 2008 Notification of Transmittal of the International Search Report from PCT/US07/09469.

PCT Nov. 4, 2008 International Preliminary Report on Patentability (1 page) and the Written Opinion of the ISA (8 pages) from PCT/US2007/009469.

PCT May 11, 2010 International Search Report from PCT/US2010/024059; 4 pages.

PCT Aug. 23, 2011 International Preliminary Report on Patentability and Written Opinion of the ISA from PCT/US2010/024059; 6 pages.

"Eye Tracking," from Wikipedia, (printed on Aug. 31, 2011) 12 pages; http://en.wikipedia.org/wiki/Eye_tracker.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.

Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages. http://www.cs.ubc.ca/~murphyk/Software/Kalman/ParticleFilterTutorial.pdf.

Boros, S., "Policy-Based Network Management with SNMP," Proceedings of the EUNICE 2000 Summer School Sep. 13-15, 2000, p. 3.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

Garg, Ashutosh, et al., "Audio-Visual ISpeaker Detection Using Dynamic Bayesian Networks," IEEE International Conference on Automatic Face and Gesture Recognition, 2000 Proceedings, 7 pages http://www.ifp.illinois.edu/~ashutosh/papers/FG00.pdf.

U.S. Appl. No. 13/298,022, filed Nov. 16, 2011, entitled "System and Method for Alerting a Participant in a Video Conference," Inventor(s): TiongHu Lian, et al.

Eye Gaze Response Interface Computer Aid (Erica) tracks eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".

Gussenhoven, Carlos, "Chapter 5 Transcription of Dutch Intonation," Nov. 9, 2003, 33 pages; http://www.ru.nl/publish/pages/516003/todisun-ah.pdf.

Hock, Hans Henrich, "Prosody vs. Syntax: Prosodic rebracketing of final vocatives in English," 4 pages; [retreived and printed on Mar. 3, 2011] http://speechprosody2010.illinois.edu/papers/100931.pdf.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages; http://www.umiacs.umd.edu/~knkim/paper/itc-cscc-2000-jgko.pdf.

Lambert, "Polycom Video Communications," © 2004 Polycom, Inc., Jun. 20, 2004 http://www.polycom.com/global/documents/whitepapers/video_communications_h.239 _people_content_polycom_patented_technology.pdf.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs. http://citeseer.ist.psu.edu/viewdoc/summary?doi=10.1.1.30.9472.

Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.

Veratech Corp., "Phantom Sentinel," © VeratechAero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

Weinstein et al., "Emerging Technologies for Teleconferencing and Telepresence," Wainhouse Research 2005 http://www.ivci.com/pdf/whitepaper-emerging-technologies-for-teleconferencing-and-telepresence.pdf.

Arrington, Michael, "eJamming—Distributed Jamming," TechCrunch; Mar. 16, 2006; http://www.techcrunch.com/2006/03/16/ejamming-distributed-jamming/: 1 page.

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0: 5 pages.

Chan et al., "Experiments on Block-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US Jan. 1, 2000, pp. 327-333; http://citeseerx.ist/psu.edu/viewdoc/summary?doi=10.1.1.35.1287.

"Cisco Expo Germany 2009 Opening," Posted on YouTube on May 4, 2009; http://www.youtube.com/watch?v=SDKsaSlz4MK; 2 pages.

eJamming Audio, Learn More; [retrieved and printed on May 27, 2010] http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili, D., et al., "Orchestral: A Distributed Platform for Virtual Musical Groups and Music Distance Learning over the Internet in JavaTM Technology"; [retrieved and printed on Jun. 6, 2010] http://ieeexplore.ieee.org/stamp/stamp.jps?tp=&arnumber=778626; 2 pages.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Z., "Head-Size Equalization for Better Visual Perception of Video Conferencing," Processings, IEEInternational Conference on Multimedia & Exp (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchesiral Manoeuvre in the Light of Telepresence," Telepresence Options, Nov. 12, 2008; http://www.telepresenceoptions.com/2008/11/orchestral_manoeuvres; 2pages.

PCT "International Search Report and the Written Opinion of the International Search Authority, or the Declaration," PCT/US2010/026456, dated Jun. 29, 2010.

PCT Search Report for PCT Application No. PCT/US2009/064061 dated Feb. 11, 2010, 4 pages.

PCT Written Opinion for PCT Application No. PCT/US2009/064061 dated Feb. 23, 2010; 14 pages.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estimation_pcs06.pdf; 6 pages.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

Schroeder, Erica, "The Next Top Model—Collaboration," Collaboration, The Workspace: A New World of Communications and Collaboration, Mar. 9, 2009; http://blogs.cisco.com/collaboration/comments/the_next_top_model; 3 pages.

Shum, H.-Y. et al., "A Review of Image-Based Rendering Techniques," in SPIE Proceedings vol. 4067(3): Proceedings of the Conference on Visual Communications and Image Processing 2000, Jun. 20-23, 2000, Perth, Australia; pp. 2-13; https://research.microsoft.com/pubs/68826/review_image_rendering.pdf.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Sullivan, Gary J., et al., "Video Compression—From Concepts to the H.264/AVC Standard," Proceedings IEEE, vol. 93, No. 1, Jan. 2005; http://ip.hhl.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emering H.263 standard," IEEE Trans. Circuits Syst. Video Technol., Apr. 1996, vol. 6, No. 2, pp. 182-190.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

"Vocative Case," from Wikipedia, [retrieved and printed on Mar. 3, 2011] 11 pages; http://en.wikipedia.org/wiki/Vocative_case.

Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Cisco: Bill Mauchly and Mod Marathe; UNC: Henry Fuchs, et al., "Depth-Dependent Perspective Rendering," Apr. 15, 2008; 6 pages.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

EPO Mar. 20, 2012 Communication from European Application 09725288.6; 6 pages.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

"OptoIQ, ""Vision + Automation Products – VideometerLab 2,""[retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages".

PCT Oct. 12, 2011 International Search Report and Written Opinion of the ISA from PCT/US2011/050380.

PCT Nov. 24, 2011 International Preliminary Report on Patentability from International Application Serial No. PCT/US2010/033880; 6 pages.

PCT Sep. 13, 2011 International Preliminary Report on Patentability and the Written Opinion of the ISA from PCT/US2010/026456; 5 pages.

PCT Jan. 23, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf ; 10 pages.

PRC Aug. 3, 2012, SIPO First Office Action from Chinese Application No. 200980119121.5; 16 pages.

EPO Jul. 10, 2012, Response to EP Communication from European Application EP10723445.2.

EPO Sep. 24, 2012, Response to Mar. 20, 2012 EP Communication from European Application EP09725288.6.

\* cited by examiner

POP-UP PIP FOR PEOPLE NOT IN PICTURE

FIELD OF THE INVENTION

Embodiments according to the present invention relate to teleconferencing. More particularly, embodiments according to the present invention relate to multipoint videoconferencing. Specifically, embodiments relate to a system and method for maintaining eye contact thus creating a more realistic environment during multipoint videoconferences.

BACKGROUND

Videoconferencing has become a common tool in both the business and home environment. In a videoconference, video cameras are used to allow participants at remote endpoints to view and hear each other. These video cameras generally have a limited viewing area and improper framing of the participants can occur if feedback to the participants is not provided. Without a method for alerting participants that they are partially out of the picture, participants must wait to be guided back into the picture by participants at other endpoints.

To solve this challenge, many video conferencing systems provide a "self-view," where participants can see their own image. This self-view is often kept on screen in a small window, or picture-in-picture (PIP). The benefit is that participants can see what they look like at other endpoints of a videoconference. However, this PIP can have a negative effect of making participants self-conscious, being constantly reminded that they are on-camera.

Therefore, what is desired are systems and methods that overcome challenges found in the art, including a method for alerting participants in a videoconference that their image is improperly framed without continually displaying the participants' image.

SUMMARY OF THE INVENTION

In order to provide feedback to a participant in a videoconference, it is desirable to have a system that will alert participants at an endpoint when their faces are improperly framed in the video image. Embodiments can be regarded as a self-view display of a participant that is initiated when the participant's face is improperly framed by the video camera.

In one exemplary embodiment, a method for displaying a self-view image for participants in a videoconference is described. The method comprises a face detection algorithm used to determine the number of faces detected by the video camera. When the number of faces changes because one or more participants are improperly framed by the video camera, a self-view image of the improperly framed participants is temporarily displayed as a PIP, giving the participants an opportunity to correct their positioning for proper framing of the video image.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Figure 1:
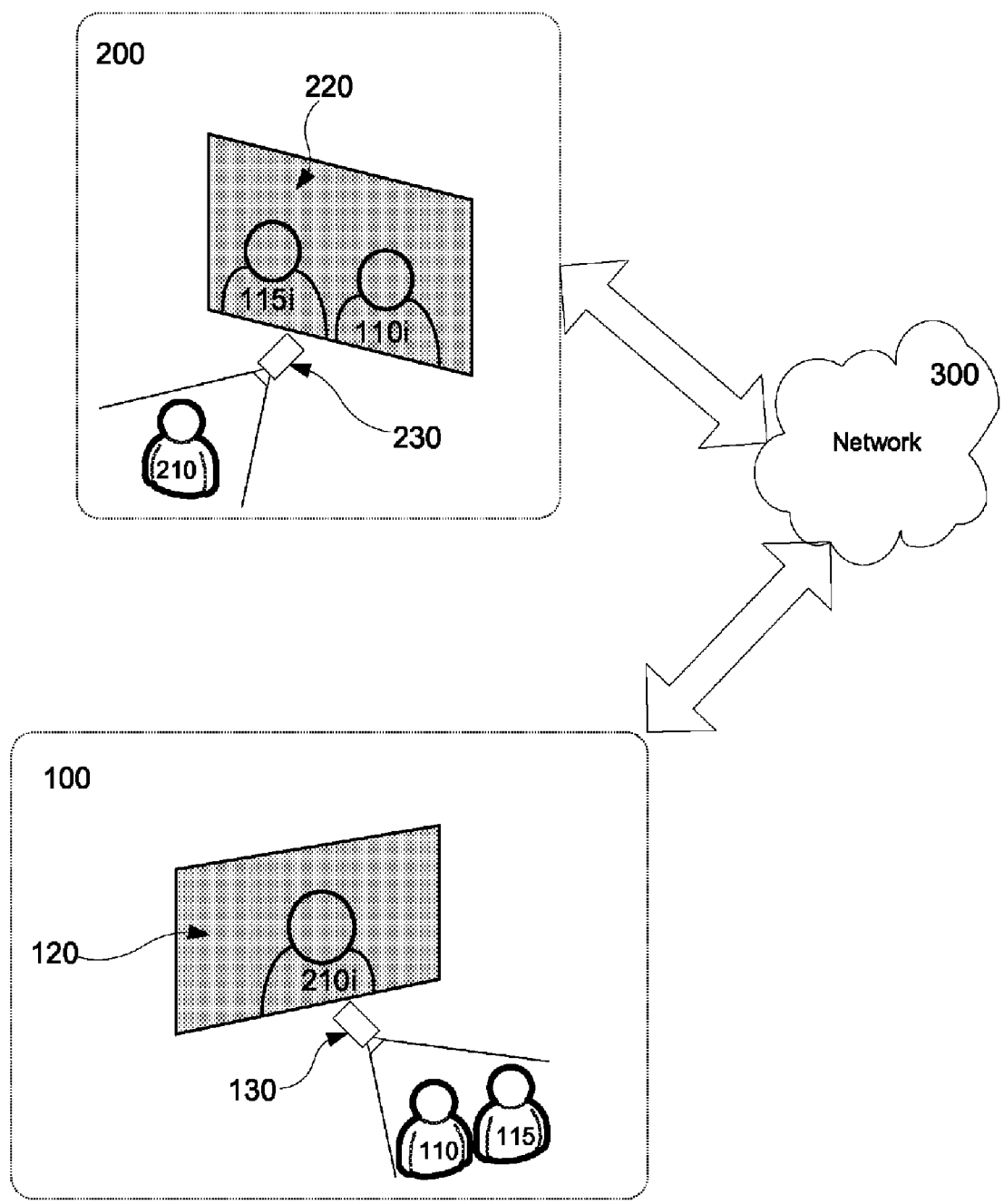
FIG. 1 illustrates a two endpoint videoconference where participants at the endpoints are properly framed by their respective video cameras.

Before the present methods and systems are disclosed and described, it is to be understood that the methods and systems are not limited to specific methods, specific components, specific systems or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of embodiments and the examples included therein and to the figures and their previous and following description.

Embodiments can be understood in the context of a video-conferencing system where a self-view PIP is temporarily displayed when the system detects the image of one or more participants being improperly framed by the videoconferencing cameras.

In accordance with the embodiments, each endpoint employs a face detection algorithm to detect changes in the number of faces being captured by the videoconference camera. A change occurs when one or more participants move such that the participant's full face is not displayed in the video image, or when one or more participants leave the videoconference. A change also occurs when a new participant enters the video image and the new participant's face is fully captured in the video image. In one embodiment, the change in the number of faces is not detected until multiple video frames indicate the new number of faces.

When a change is detected, a self-view PIP will appear or temporarily appear on the participant's display showing the image or a representation of the image of the participant captured by the video camera, affording the participant the opportunity to correct the participant's position to properly frame the video image.

In another embodiment, the expected number of participants is determined at each endpoint participating in a videoconference. When the face detection algorithm determines that a different number of faces is being detected by one or more cameras at the endpoint than the expected number of participants, the self-view PIP will be displayed or temporarily be displayed with a representation of the image of the participants captured by the video camera. For example, if two participants are expected but the face detection algorithm detects less than two or more than two faces, then a self-view PIP will appear or temporarily appear on the participants' display showing the image or a representation of the image of the participants captured by the video camera. To determine the expected number of faces in a video image, the endpoint may use a plurality of algorithms. For example, when the face detection algorithm detects the same number of faces over multiple video frames, that number of faces may be used as the expected or current number of participants to be captured by the video camera. Another example would be to use a hysteresis mechanism to average the number of faces detected over a series of image frames. These algorithms may also be used when detecting changes in the number of faces detected by the face detection algorithm.

In another embodiment, the determination of the expected number of participants to be captured by a videoconference camera may be a user defined value. In this configuration, one or more of the participants at each endpoint indicates through a user input, the number of faces expected to be captured by the videoconference cameras.

In one embodiment the self-view PIP is displayed until one of a plurality of possible events, such as the expiration of a timer or when the face detection algorithm detects the expected number of faces. In other embodiments, once displayed, the PIP will remain until the videoconference is terminated.

In accordance with an embodiment of the method, the face detection algorithm may be based on the methods as described in U.S. application Ser. No. 12/021,198, entitled "REAL-TIME FACE DETECTION," filed Jan. 28, 2008 by Tian et al., fully incorporated herein by reference, though other methods of participant detection and face detection algorithms known to one of ordinary skill in the art are contemplated within the scope of embodiments according to the present invention. Using edge detection and color segmentation to determine block-level edge features, methods described in this incorporated application determine which video blocks in the picture are likely to be that of a face. To reduce false negative responses, a hysteresis mechanism is employed to smooth out the response. Note, while the application refers to face detection as a means for determining the number of participants captured in a video image, in another embodiment, the detection of a participant being properly framed in a video image may be based on the participant's face and a portion of the participant's torso. By using a face detection algorithm in conjunction with an edge detection algorithm to determine the outline of a participant's torso, the method can detect proper framing in a video image of a participant's face and torso.

FIG. 1 illustrates a simplified non-limiting example of a two endpoint 100, 200 videoconference. Note, while the examples described here show two endpoints, this method and system can be applied to multipoint videoconferences where there are more than two endpoints. In FIG. 1 each endpoint 100, 200 comprises one or more displays 120, 220 and one or more video cameras 130, 230. The video cameras 130, 230 are operably connected to the display 220, 120 at the remote endpoint 200, 100 through a network 300. The system is controlled by one or more processors (not shown). The video image 210*i* of a participant 210 at the second endpoint 200 is displayed on the screen 120 at the remote first endpoint 100. The video image 110*i*, 115*i* of the participants 110, 115 at the first endpoint 100 is displayed on the screen 220 of the remote second endpoint 200.

Figure 2:
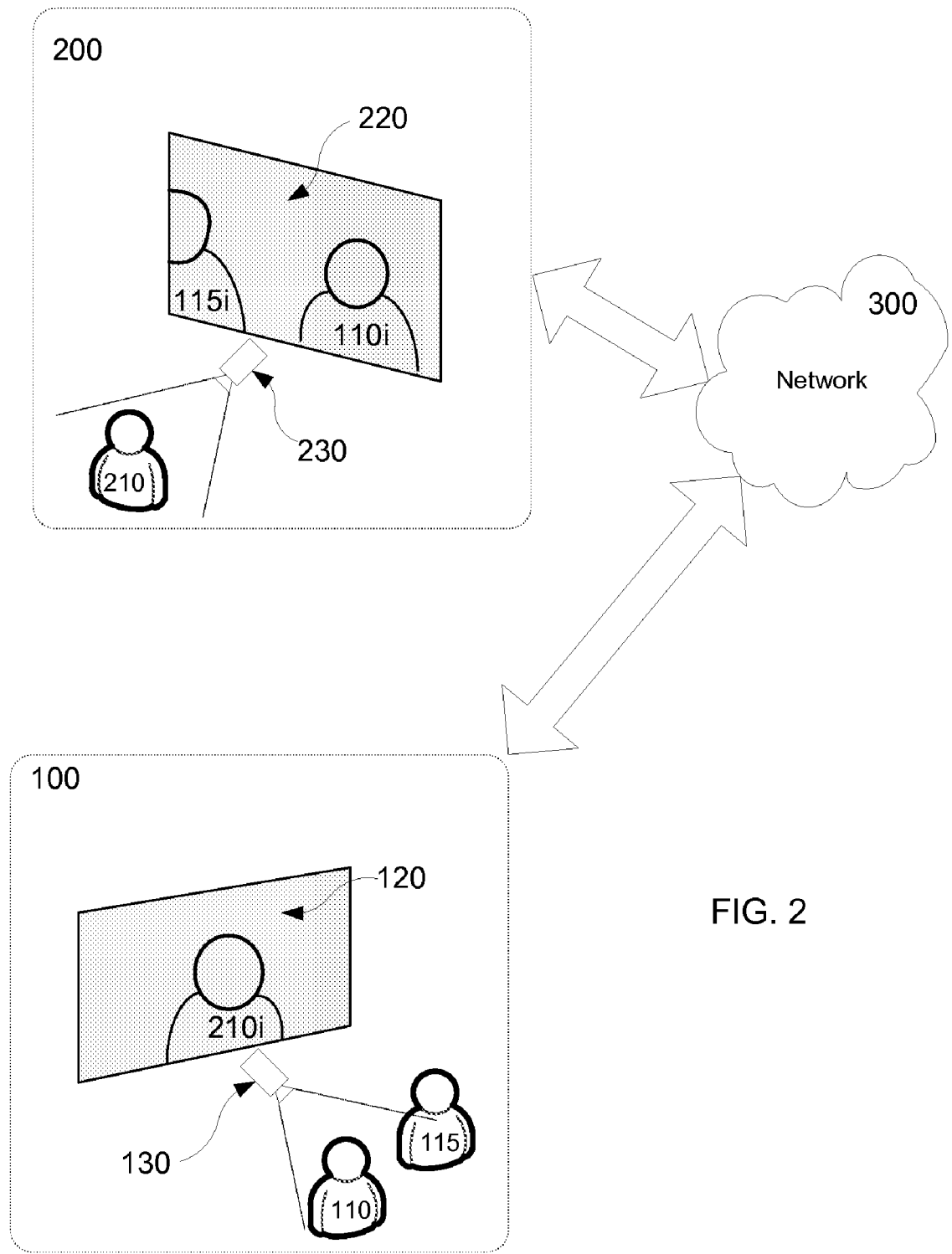
FIG. 2 illustrates a two endpoint videoconference where one participant at one endpoint is improperly framed by the respective video camera.

FIG. 2 illustrates a simplified non-limiting example of when at least one participant 115 in a videoconference has changed position such that the participant's image 115*i* is improperly framed. The image captured by the camera 130 is displayed on the screen 220 of the remote endpoint 200. Because the participant 115 is positioned incorrectly, the image 115*i* shows a partial image of the participant 115.

Figure 3:
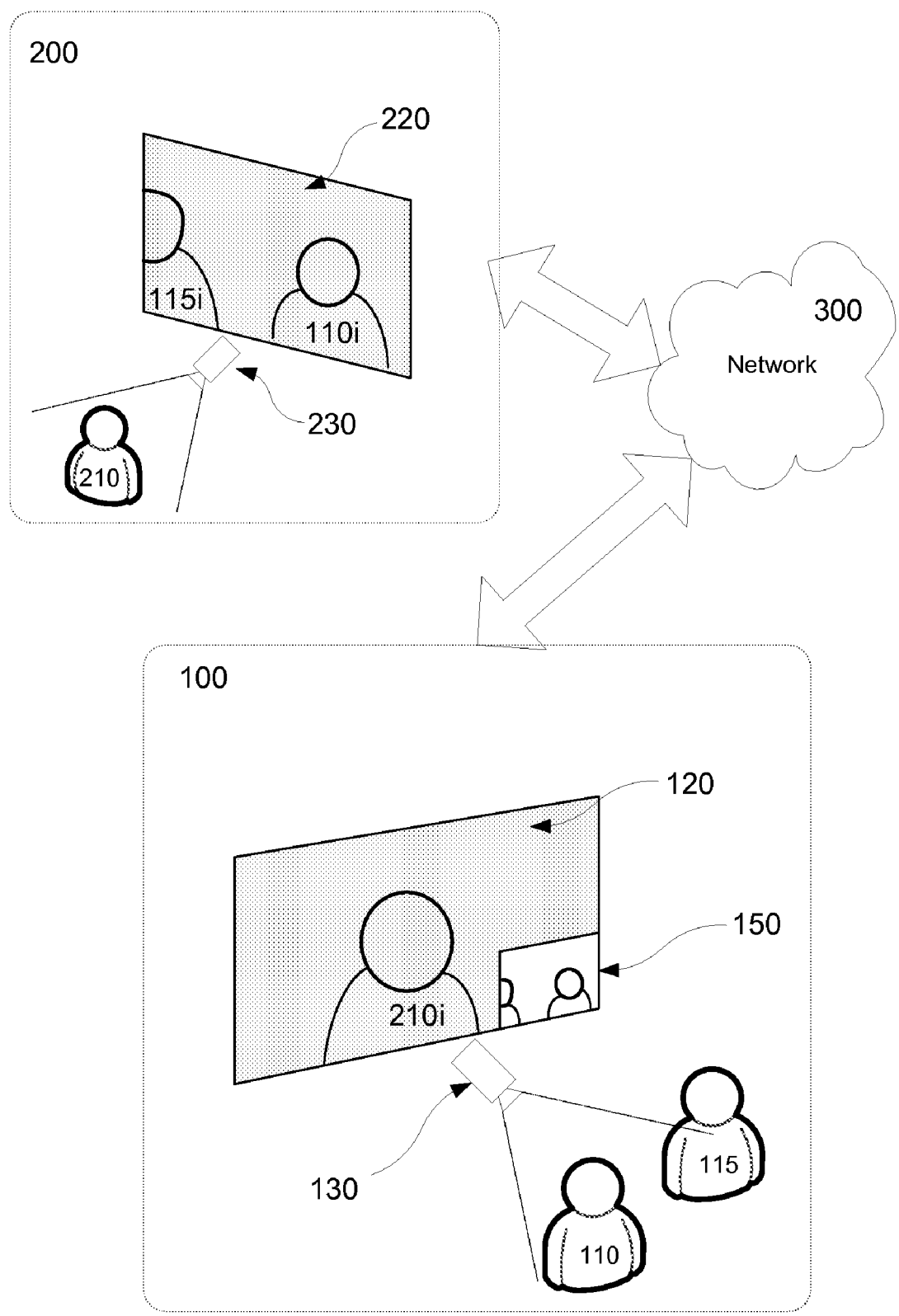
FIG. 3 illustrates an embodiment showing a self-view PIP displaying improperly framed participants.

FIG. 3 illustrates a simplified non-limiting example of an embodiment of a self-view PIP 150. When the situation described in FIG. 2 occurs, where at least one participant 115 is improperly framed, the face detection algorithm detects a change in the number of faces being detected by the videoconference camera 130. A self-view PIP 150 is temporarily displayed, giving the participant 115 an opportunity to correct the framing of the image by repositioning themselves. The self-view PIP 150 is displayed or temporarily displayed on the display 120 being viewed by the improperly framed participant 115 giving the participant 115 an opportunity to correct the participant's position with respect to the capture area of the camera 130.

In an embodiment, the self-view PIP 150 is displayed on the screen 120 for a period of time before it is removed from the screen 120. If no one is in the image being captured by the camera 130, and a participant enters, the self-view PIP 150 is displayed. If one or more participants 110, 115 are in the picture and at least one becomes improperly framed 115 such that the participants full face is not detected, the self-view PIP 150 appear or if a participant permanently leaves the videoconference, the self-view PIP 150 appears for a short time, then disappears.

In one aspect the image in self-view PIP 150 does not need to be the video image captured by the videoconference camera 130. A computer generated representation or outline of the video image may be used or any other representation of the image captured by a videoconference camera or a participant.

Figure 4:
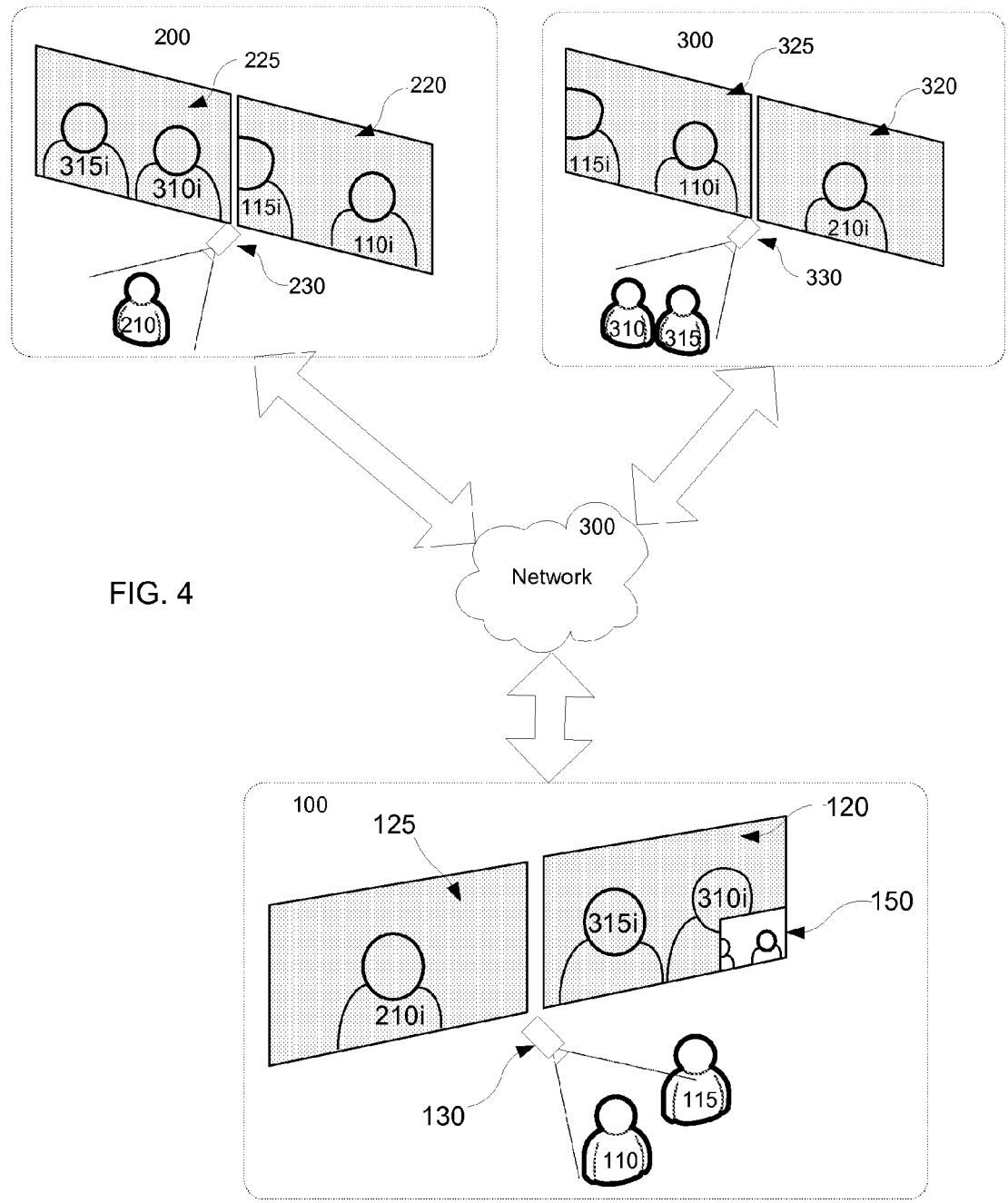
FIG. 4 illustrates an embodiment showing a three endpoint videoconference where one participant at one endpoint is improperly framed by the respective video camera.

FIG. 4 illustrates a simplified non-limiting example of an embodiment of a self-view PIP 150 within a three endpoint system. Like the situation described in FIG. 2, at least one participant 115 at an endpoint 100 has moved such that the participant's image 115*i* is not framed within the displays 220, 230 at the other endpoints 200, 300. The video image captured by the camera 130 is displayed at the remote endpoints 200, 300 and is also used by the face detection algorithm of the local endpoint 100 to detect a change in the number of faces being captured by the video camera 130. When at least one participant 115 moves such that the participant's face is completely out of the image, or is partially out of the image 115*i*, the face detection algorithm detects a change in the number of faces. Additionally, a change in the number of faces is detected if a new participant joins the video conference such that the new participant's face is fully captured by the video camera.

In one embodiment, at the detection of a change in the number of faces in the video image, a self-view PIP will appear or temporarily appear on at least one of the plurality of displays 120, 125 at the endpoint 100 detecting the change.

Figure 5:
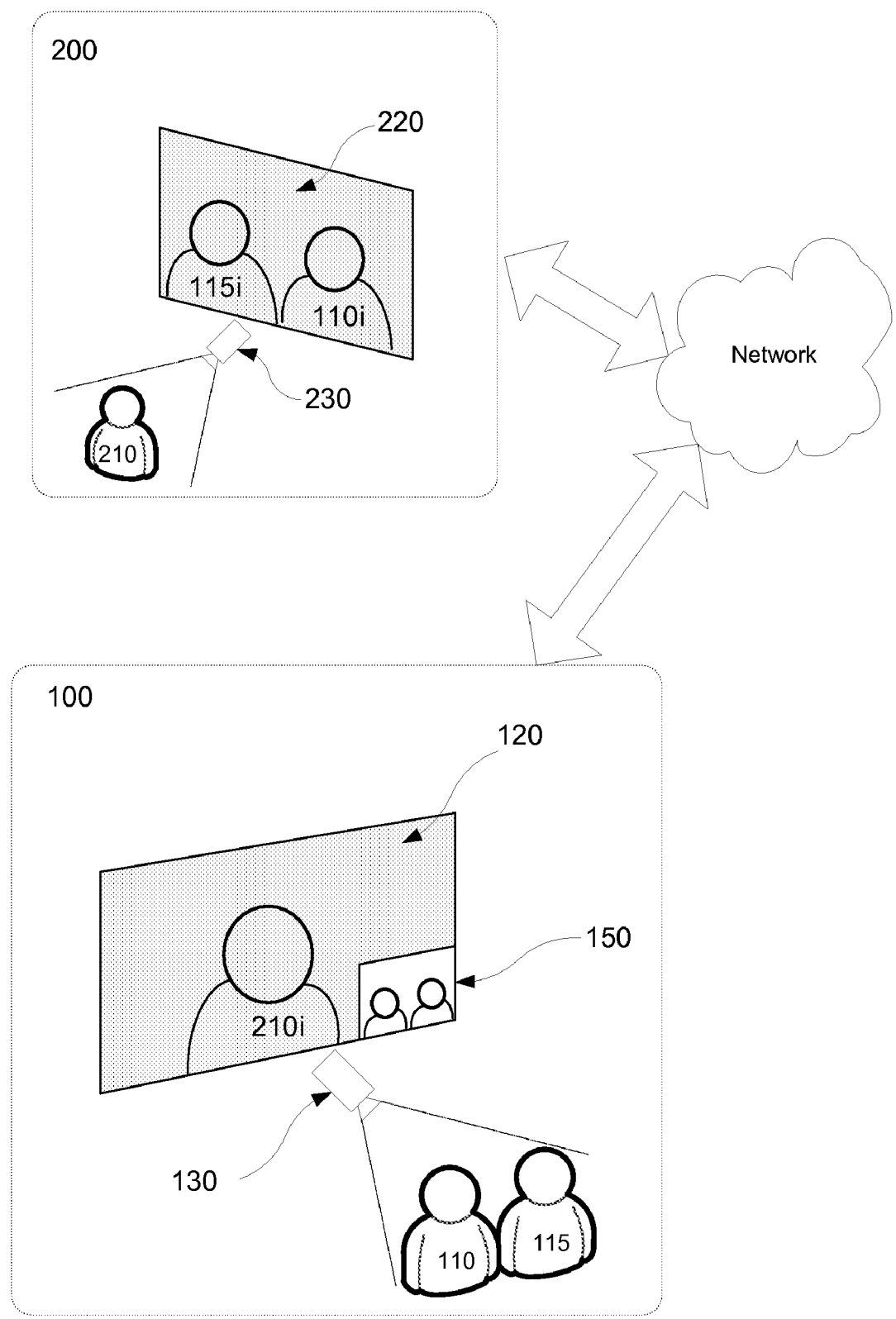
FIG. 5 illustrates an embodiment showing a self-view PIP displaying properly framed participants.

FIG. 5 illustrates a simplified non-limiting example of an embodiment of a self-view PIP 150. When the self-view PIP appears showing the improperly framed image 115i of the participant 115, the participant 115 sees the improperly framed image and has the opportunity to adjust the participant's position to being within the capture area of the camera 130.

Figure 6:
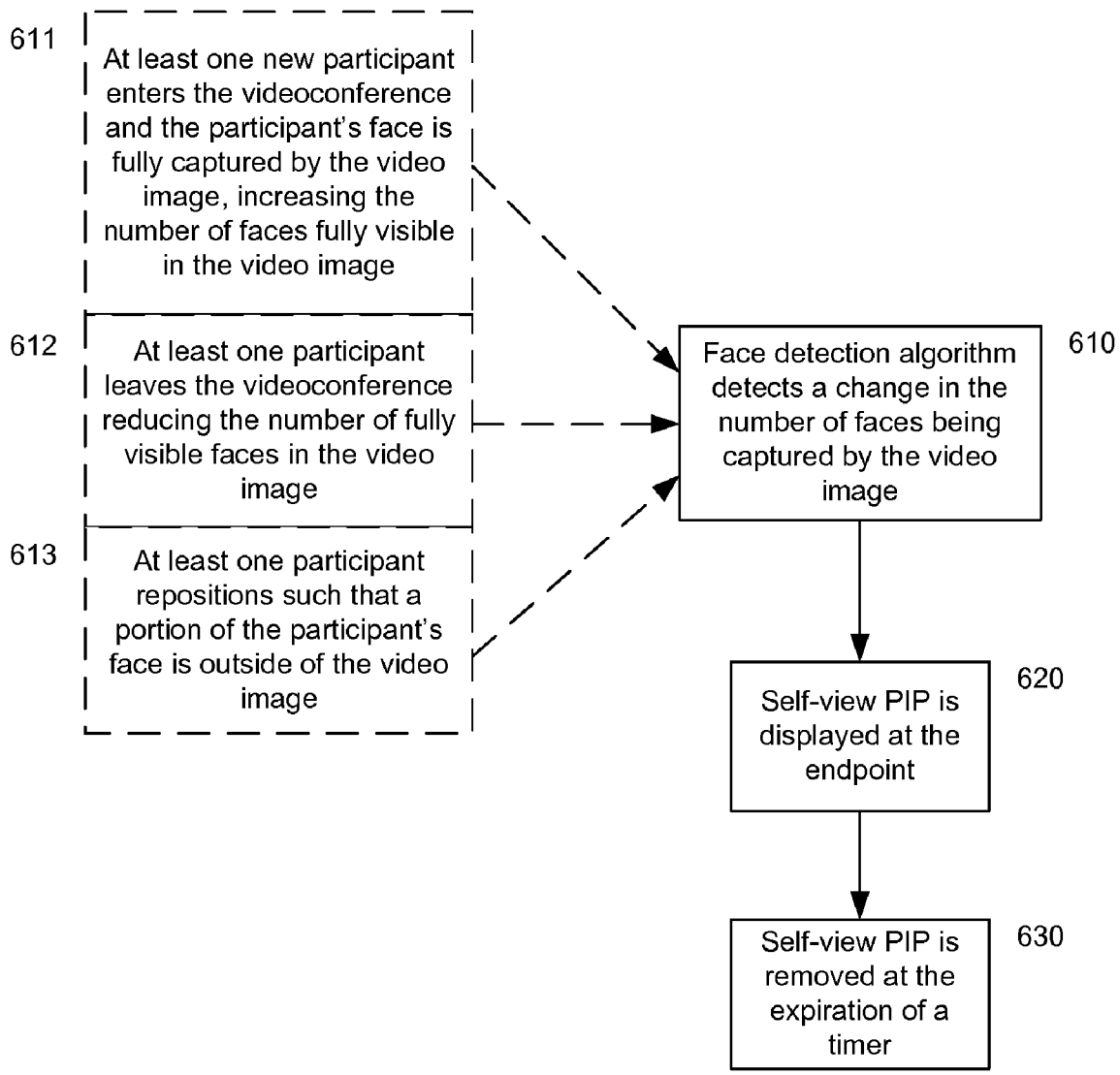
FIG. 6 illustrates an exemplary flow chart describing steps associated with logic used by a method, according to one embodiment.

FIG. 6 illustrates a flow chart of an embodiment of logic for practicing an aspect according to the present invention. In this embodiment, when at least one of a plurality of events 611, 612, 613 occurs, the face detection algorithm 610 detects a change in the number of faces being captured by the video image. In block 620, upon detection of a change in the number of faces being captured in the video image, the self-view PIP with the video image or representation of the participants is displayed at the endpoint detecting the change. The self-view PIP is removed from the display in block 630, upon the expiration of a timer. Note, the expiration of a timer is one of a plurality of possible events used to trigger the removal of the self-view PIP. For example and not meant to be limiting, the triggering event could be when an improperly framed participant has moved back into the video image frame such that the participant's full face is now captured in the video image. Yet another non-limiting possible triggering event could be a command from the participants through a user input device.

Figure 7:
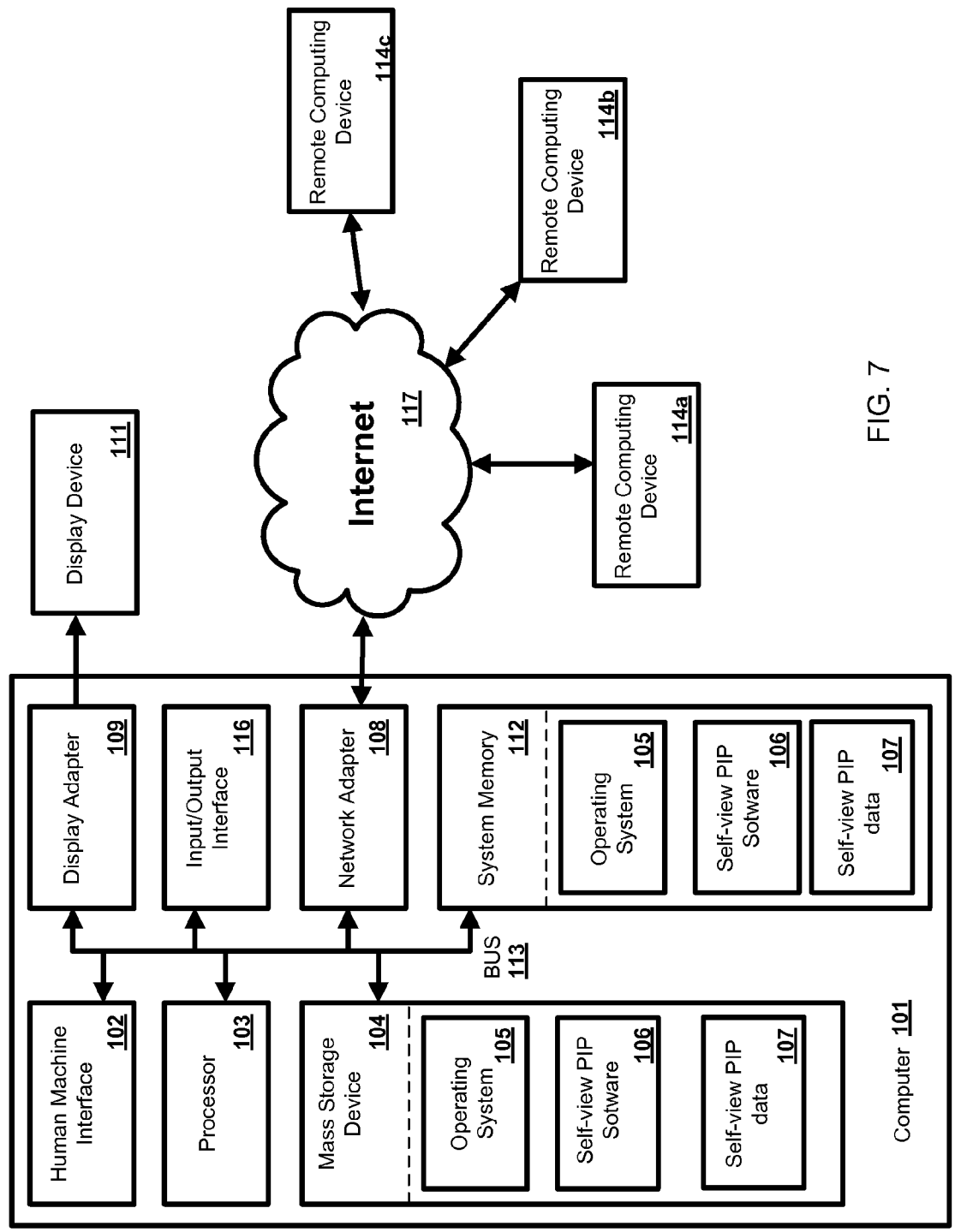
FIG. 7 illustrates an embodiment showing the execution of the method on a computer.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the Self-view PIP Software 106 as illustrated in FIG. 7 and described below. In one exemplary aspect, the units can comprise a computer 101 as illustrated in FIG. 6 and described below.

FIG. 7 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, self-view PIP software 106, self-view PIP data 107, a network adapter 108, system memory 112, an Input/Output Interface 116, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as self-view PIP data 107 and/or program modules such as operating system 105 and self-view PIP software 106 that are immediately accessible to and/or are presently operated on by the processing unit 103.

In another aspect, the computer 101 can also comprise other removable/non-removable, volatile/non-volatile computer storage media. By way of example, FIG. 7 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and self-view PIP software 106.

Each of the operating system 105 and self-view PIP software 106 (or some combination thereof) can comprise elements of the programming and the self-view PIP software 106. Self-view PIP data 107 can also be stored on the mass storage device 104. Self-view PIP data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 116. Any step and/or result of the methods can be output in any form to an output device, The computer 101 can operate in a networked environment using logical connections to one or more remote computing devices 114*a*, 114*b*, 114*c*. By way of example, a remote computing device can be a personal computer, portable computer, a server, a router, a network computer, a peer device or other common network node, and so on. Logical connections between the computer 101 and a remote computing device 114*a*, 114*b*, 114*c* can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 117.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of self-view PIP software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for notifying a video conference participant comprising:
   determining, in a video conference comprising a plurality of participants at a plurality of endpoints, that a change has occurred in a number of participants being captured in a video image by a video conference camera at an endpoint; and
   providing at the endpoint an alert that the change has occurred;
   wherein the alert is provided without altering a view of the video conference camera.

2. The method of claim 1, wherein determining that a change has occurred comprises:
   determining a count of the plurality of participant's body or a portion of the participant's body in the video image captured by the video conference camera; and
   comparing the count of the plurality of participant's body or portion of the participant's body in the current video image with a stored value.

3. The method of claim 2, wherein the stored value comprises a participant defined value.

4. The method of claim 2, wherein the stored value comprises a count of the plurality of participant's body or portion of the participant's body from a recent video image captured by the video conference camera.

5. The method claim of 2, wherein the portion of the participant's body in the video image captured by the video conference camera comprises a participant's face.

6. The method claim of 2, wherein the portion of the participant's body in the video image captured by the video conference camera comprises a participant's face and torso.

7. The method claim of 2, wherein determining the count of the plurality of participant's body or portion of the participant's body in the video image captured by the video conference camera comprises using a face detection algorithm.

8. The method claim of 1, wherein providing at the endpoint an alert that the change has occurred comprises:
displaying a representative self-view picture-in-picture image of the plurality of participant's body or portion of the participant's body currently captured by the video conference camera to each respective plurality of participants; and
removing the representative self-view picture-in-picture image of the plurality of participant's body or portion of the participant's body currently captured by the video conference camera at the occurrence of an event.

9. The method claim of 8, wherein displaying the representative self-view picture-in-picture image of the plurality of participant's body or portion of the participant's body currently captured by the video conference camera to each respective plurality of participants comprises overlaying the representative self-view picture-in-picture image on top of a portion of a video conference image provided by another of the plurality of endpoints.

10. The method claim of 8, wherein removing the representative self-view picture-in-picture image of the plurality of participant's body or portion of the participant's body currently captured by the video conference camera at the occurrence of the event comprises removing the representative self-view picture-in-picture image on expiration of a timer.

11. The method claim of 8, wherein removing the representative self-view picture-in-picture image of the plurality of faces currently captured by the video conference camera at the occurrence of the event comprises removing the representative self-view picture-in-picture image when the number of participants detected by the face detection algorithm equals the stored value.

12. The method claim of 8, wherein removing the representative self-view picture-in-picture image of the plurality of participant's body or portion of the participant's body currently captured by the video conference camera at the occurrence of the event comprises removing the representative self-view picture-in-picture image at expiration of a timer after the face detection algorithm detects an expected number of participant's body or portion of the participant's body.

13. The method claim of 8, wherein the representative self-view picture-in-picture image further comprises a video image being captured by the video conference camera.

14. The method claim of 8, wherein the representative self-view picture-in-picture image further comprises a computer generated rendition of the plurality of participant's body or portion of the participant's body being captured by the video conference camera.

15. A system for notifying a participant in a video conference comprising:
a plurality of endpoints operably connected by a network, wherein each endpoint comprises at least one video conference camera and at least one display; and
a processor, wherein the processor is configured to
determine in a video conference comprising a plurality of participants at the plurality of endpoints that a change has occurred in a number of participants being captured in a video image by a video conference camera at an endpoint; and
provide at the endpoint an alert that the change has occurred;
wherein the alert is provided without altering a view of the video conference camera.

16. The system claim of 15, wherein the processor is configured to determine that the number of participants being captured in the video image at the endpoint has changed comprises the processor being further configured to:
use a face detection algorithm to determine a count of the plurality of participant's body or a portion of the participant's body in a video image captured by the video conference camera; and
compare the count of the plurality of participant's body or portion of the participant's body in the video image with a stored count.

17. The system claim of 16, wherein the processor is configured to compare the count of the plurality of participant's body or portion of the body in the video image with the stored count comprises the processor being further configured to save a count by the face detection algorithm of a recent video image as the stored count.

18. The system claim of 16, wherein the processor is configured to compare the count of the plurality of participant's body or portion of the body in the video image with the stored count comprises the processor being further configured use as the stored count a value selected by the participant through a user input.

19. The system claim of 15, wherein the processor is configured to alert at least one of the plurality of participants at the endpoint that the change has occurred comprises the processor being further configured to:
display a representative self-view picture-in-picture image of a plurality of participants currently captured by the video conference camera; and
remove the representative self-view picture-in-picture image of the plurality of participants currently captured by the video conference camera at the occurrence of an event.

20. The system claim of 19, wherein the processor is configured to display the representative self-view picture-in-picture image of a plurality of participants currently captured by the video conference camera comprises the processor being further configured to overlay the self-view picture-in-picture image on top of a portion of a video conference image sourced by another of the plurality of endpoints.

21. The system claim of 19, wherein the processor is configured to remove the representative self-view picture-in-picture image of the plurality of participants currently captured by the video conference camera at the occurrence of the event comprises the processor being further configured to remove the representative self-view picture-in-picture image at the expiration of a time period.

22. The system claim of 19, wherein the processor is configured to remove the representative self-view picture-in-picture image of the plurality of participants currently captured by the video conference camera at the occurrence of the event comprises the processor being further configured to remove the representative self-view picture-in-picture image when the face detection algorithm detects the same number of participants as the stored value.

23. The system claim of 19, wherein the processor is configured to remove the representative self-view picture-in-picture image of the plurality of participants currently captured by the video conference camera at the occurrence of an event comprises the processor being further configured to remove the representative self-view picture-in-picture image at the expiration of a time period after the face detection algorithm detects the same number of participants as the stored value.

24. The system claim of 19, wherein the processor is configured to display the representative self-view picture-in-picture image of the plurality of participants currently captured by the video conference camera comprises the processor being configured to display the image captured by the video conference camera as the self-view picture-in-picture image.

25. The system claim of 19, wherein the processor is configured to display the representative self-view picture-in-picture image of the plurality of participants currently captured by the video conference camera comprises the processor being configured to display in the self-view picture-in-picture image a computer generated rendition of the plurality of faces being captured by the video conference camera.

* * * * *